UNITED STATES PATENT OFFICE.

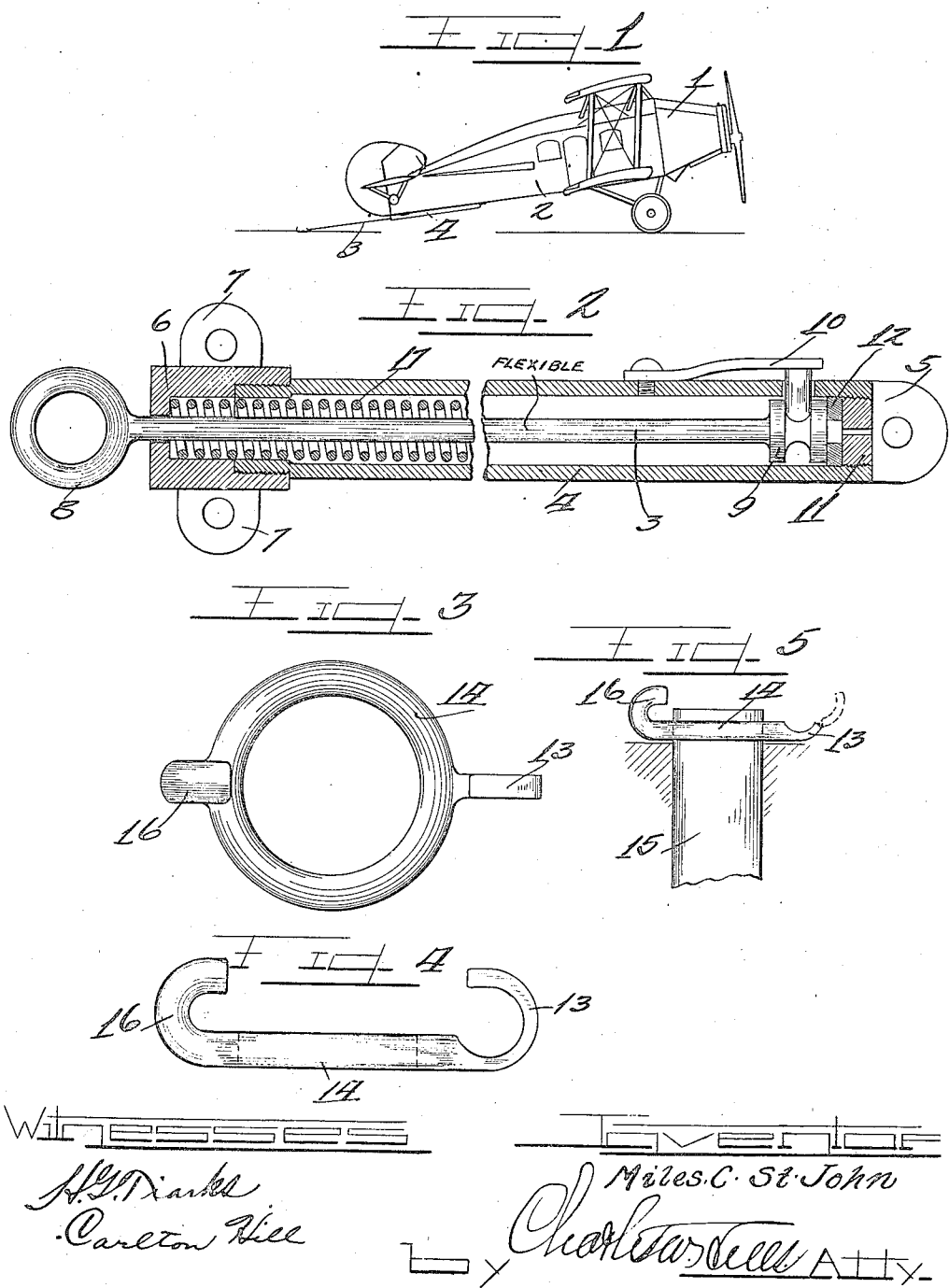

MILES C. ST. JOHN, OF CHICAGO, ILLINOIS.

AUTOMATICALLY-RELEASING ANCHORING DEVICE FOR AERIAL VEHICLES.

1,427,500.     Specification of Letters Patent.     Patented Aug. 29, 1922.

Application filed August 2, 1920. Serial No. 400,706.

*To all whom it may concern:*

Be it known that I, MILES C. ST. JOHN, a citizen of the United States, and a resident of the city of Chicago, in the county of Cook and State of Illinois, have invented certain new and useful Improvements in Automatically-Releasing Anchoring Devices for Aerial Vehicles; and I do hereby declare that the following is a full, clear, and exact description of the same, reference being had to the accompanying drawings, and to the numerals of reference marked thereon, which form a part of this specification.

This invention relates to an automatically releasing anchoring device for aerial vehicles. Before an airplane will rise from the surface of the ground it is necessary that a considerable propeller speed be attained in order to provide the requisite lifting power. Where large flying fields are available, this is accomplished by allowing the airplane to progress along the ground until a sufficient propeller speed has been attained when the elevator members are manipulated and the machine goes into the air. If, however, the space of the flying field is limited, it is necessary that the machine be held stationary until the requisite propeller speed is attained in order that the machine may be made to take the air without traversing a long stretch of ground. The practice hitherto has been to block the wheels of the airplane or to have the airplane held stationary by a number of men until sufficient speed has been attained by the propeller and then to remove the blocks or manually release the airplane. This method, however, was proved to be inconvenient and is impracticable when there is no one present to hold the machine or to lift the blocks which have been holding the wheels thereof.

The principal object, therefore, of this invention is to provide an automatically releasing anchoring device for aerial vehicles.

It is also an important object of this invention to provide a self contained anchoring device adapted to be secured to the fuselage of an airplane whereby the airplane may be anchored to the surface of the ground until a high rate of propeller speed is attained.

Other and further important objects of this invention will be apparent from the disclosures in the specification and the accompanying drawings.

The invention (in a preferred form) is illustrated in the drawings and hereinafter more fully described.

On the drawings:

Figure 1 is a view in side elevation of an airplane showing the automatically releasing anchoring device of this invention secured thereon.

Figure 2 is a longitudinal section taken through the self-contained anchoring device.

Figure 3 is a plan view of the releasing hook.

Figure 4 is an elevational view of the same.

Figure 5 is a view in elevation showing the releasing hook in position on a stake.

As shown on the drawings:

The automatically releasing anchoring device of this invention is adapted to be secured on the under side of the rear portion of the fuselage 2 of an airplane 1, and comprises the anchor cable or wire 3, which is normally carried in the casing 4. Said casing 4 ordinarily comprises a cylindrical metallic tube which is internally threaded at its inner end and has an apertured flange 5 integral with and projecting from said internally threaded inner end. The outer end of the casing 4 is threaded externally and has the centrally apertured internally threaded and recessed cap 6 engaged thereon. Laterally extending apertured attaching flanges are formed on said cap 6 adapting it to be secured to the fuselage 2 of the airplane by bolts or screws engaged through the apertures therein. The anchor wire or cable 3 is engaged through the central aperture in the cap 6 and an eye or ring 8 is formed on the outer end thereof. A grooved plunger head 9 is secured on the inner end of the anchor cable 3, and said plunger head 9 is slidable in the cylinder 4. For normally retaining the plunger head 9 in the inner end of the cylindrical casing 4, the spring-pressed detent 10 is engaged in the groove therein. For closing, the inner end of the casing 4 is internally threaded and a centrally apertured plug 11 is engaged therein. To provide a cushion between the plunger head 9 and the plug 11 a centrally apertured rubber washer 12 is secured in the casing engaging the inner side of said plug 11. As shown in Figure 2, a coil spring 17 is engaged around the anchor cable 3 inside the casing 4 for a purpose hereinafter to be described.

To provide for automatically releasing the anchor cable 3, the ring 8 on the outer end thereof is engaged when the machine is anchored in a hook 13 which is normally formed on a ring 14 adapted to be engaged around a stake 15. Said hook 13 is so constructed that it will break, as shown in Figure 5, and release the ring 8 and the anchor cable 3 when a predetermined amount of tension is exerted thereon. In order that the hook 13 may be secured in an iron ring instead of to the stake 15, the opposite side of the ring 14 is provided with a hook 16 which may be engaged in an iron ring.

The operation is as follows:

The self-contained anchoring device is secured to the under side of the fuselage 2 of the airplane 1 by screws or bolts engaged through the apertures in the flanges 5 and 7 and when it is desired to anchor the airplane thereby the spring-pressed detent 10 is manually released and the anchor cable or wire 3 is drawn from the casing 4. The automatic break-away hook 13 is secured to the ground by engaging the ring 14 thereof around the stake 15 and the ring 8 in the outer end of the anchor cable is engaged in the hook 13. The airplane motor is started and when sufficient tension is exerted on the anchor cable 3 by the pull of the airplane propeller, the hook 13 will break and the airplane will be released. The compression which has been exerted on the spiral spring 17 inside the casing 3 by the pressure of the plunger head 9 thereon will of course also be released and the reaction of said spring on the plunger head 9 will cause the plunger head and the anchor cable 3 to be forcibly drawn back into the casing. The spring-pressed detent 10 will again be engaged in the grooves in the plunger head 9 due to the recoil thereof. Since many flying fields will be provided with anchoring rings which will be secured in concrete bases, the automatic break-away hooks 13 are provided with hook portions 16 on the rings 14 thereof for engagement with said anchoring rings. In case these are used it is of course not necessary to provide stakes 15.

While the automatically releasing anchor device of this invention has been herein shown and described in connection with the automatic break-away hooks 15, means may also be provided for manually releasing the eye 8 by a connection from the driving seat if so desired.

Due to the fact that the anchoring device described herein is secured to the rear of the airplane, there is no tendency to hold down the forward portion thereof and it is therefore possible for an airplane equipped with the device to go into the air from a very short starting space.

I am aware that numerous details of construction may be varied through a wide range without departing from the principles of this invention, and I therefore do not purpose limiting the patent granted otherwise than necessitated by the prior art.

I claim as my invention:

1. The combination with an aerial vehicle, of a casing secured thereto, flexible anchoring means normally carried in the casing and adapted to be withdrawn therefrom, and resilient means in the casing and a part on the flexible means contacting with said resilient means only after a lost motion.

2. In a device of the class described, the combination with a casing, of flexible means therein and adapted to be withdrawn therefrom, a plunger slidable in the casing and secured to the inner end of the flexible means, and a spring in the casing adapted to be engaged by said plunger when said plunger has traveled a part of the length of said casing in response to the withdrawal of said flexible means and compressed when the flexible means are further withdrawn from the casing.

3. In a device of the class described the combination with a casing, of flexible means therein, and adapted to be manually withdrawn therefrom, a plunger slidable in the casing and secured to the inner end of the flexible means, and a coil spring in the casing adapted to be compressed by the plunger when the flexible means are withdrawn therefrom and a space for lost motion between said plunger and said coil spring.

4. In an automatic releasing anchoring device, a housing, a flexible attaching means in said housing extending to the outside thereof, a spring, a part on the inner end of said attaching means cooperating with said spring to return the attaching means toward housed position after it has been withdrawn, and a detent for holding the attaching means in housed position.

5. In an automatic releasing anchoring device, a housing, a flexible attaching means in said housing extending to the outside thereof, a spring, a part on the inner end of said attaching means cooperating with said spring to return the attaching means toward housed position after it has been withdrawn, there being lost motion between the part and the spring, whereby the completion of the return of the attaching means to housed position is by momentum of said means, and a manually controlled detent for retaining the attaching means in extreme housed position.

In testimony whereof I have hereunto subscribed my name in the presence of two subscribing witnesses.

MILES C. ST. JOHN.

Witnesses:
EARL M. HARDINE,
CARLTON HILLS.